(12) United States Patent
Matt et al.

(10) Patent No.: US 7,258,370 B2
(45) Date of Patent: Aug. 21, 2007

(54) FLUID DISTRIBUTION SYSTEM

(75) Inventors: Gunter Gray Matt, Charlotte, NC (US); James Christopher Collins, Mooresville, NC (US); Michael Patrick Cain, Huntersville, NC (US); Paul Harry Adkins, Davidson, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 11/328,699

(22) Filed: Jan. 10, 2006

(65) Prior Publication Data

US 2006/0113791 A1 Jun. 1, 2006

Related U.S. Application Data

(63) Continuation of application No. 10/811,132, filed on Mar. 26, 2004, now Pat. No. 7,195,289.

(51) Int. Cl.
*F16L 5/00* (2006.01)
(52) U.S. Cl. .................. 285/189; 285/204; 285/376
(58) Field of Classification Search ............ 285/189, 285/202, 203, 204, 208, 376
See application file for complete search history.

(56) References Cited

U.S. PATENT DOCUMENTS

| 815,627 | A | * | 3/1906 | Oldham ............ 285/84 |
| 1,253,065 | A | | 1/1918 | Looze |
| 1,306,236 | A | | 6/1919 | Sloan |
| 2,183,271 | A | | 12/1939 | Wendel |
| 3,370,144 | A | * | 2/1968 | Arthur et al. ............ 210/222 |
| 3,722,923 | A | | 3/1973 | Grahl |
| 3,752,509 | A | | 8/1973 | Stafford |
| 3,876,234 | A | | 4/1975 | Harms |
| 3,893,716 | A | | 7/1975 | Moreiras et al. |
| 3,917,324 | A | | 11/1975 | Wakatsuki et al. |
| 3,986,736 | A | | 10/1976 | Takagi et al. |
| 4,112,922 | A | | 9/1978 | Skinner et al. |
| 4,136,896 | A | | 1/1979 | Rodman et al. |
| 4,162,802 | A | | 7/1979 | Cox |
| 4,302,874 | A | | 12/1981 | Colas |
| 4,431,218 | A | | 2/1984 | Paul, Jr. et al. |

(Continued)

FOREIGN PATENT DOCUMENTS

DE 199 49 926 5/2001

(Continued)

*Primary Examiner*—David Bochna
(74) *Attorney, Agent, or Firm*—Michael Best & Friedrich LLP (57) ABSTRACT

An outlet plate fitting configured for attaching a secondary component to a fluid pipe section. The fluid pipe section includes opposed flanges that define a receiving groove having a bottom surface. The outlet plate fitting includes a main body, an engagement platform connected to and at a distance from the main body, and a bore extending through the main body and the engagement platform. A first surface of the engagement platform faces away from the main body and is a planar surface with a seal member positioned about the bore. A second surface of the engagement platform faces toward the main body and has a ramped surface, such that rotation of the engagement platform in a first direction within the receiving groove causes the planar surface and seal member into sealing engagement with the bottom surface of the receiving groove.

4 Claims, 8 Drawing Sheets

U.S. PATENT DOCUMENTS

| | | | |
|---|---|---|---|
| 4,449,737 A * | 5/1984 | Specht ........................ 285/7 |
| 4,466,600 A | 8/1984 | Tuttle |
| 4,722,673 A | 2/1988 | Grime et al. |
| 4,766,664 A | 8/1988 | Benedyk |
| 5,071,140 A | 12/1991 | Quevedo del Rio |
| 5,785,359 A | 7/1998 | Nagai et al. |
| 5,806,897 A | 9/1998 | Nagai et al. |
| 5,934,714 A | 8/1999 | Sugiyama et al. |
| 5,938,245 A | 8/1999 | Guzzoni |
| 5,954,375 A | 9/1999 | Trickle et al. |
| 6,131,963 A | 10/2000 | Williams et al. |
| 6,137,417 A | 10/2000 | McDermott |
| 6,179,349 B1 | 1/2001 | Guzzoni |
| 6,193,281 B1 | 2/2001 | Nagai et al. |
| 6,217,084 B1 | 4/2001 | Larsson et al. |
| 6,385,978 B1 | 5/2002 | Elliott |
| 2001/0052699 A1 | 12/2001 | Guest |
| 2002/0053798 A1 | 5/2002 | Mehr |
| 2003/0014855 A1 | 1/2003 | Guzzoni |

FOREIGN PATENT DOCUMENTS

| | | |
|---|---|---|
| EP | 0919758 | 6/1999 |
| GB | 2 246 609 | 2/1992 |

* cited by examiner

FLUID DISTRIBUTION SYSTEM

RELATED APPLICATION DATA

This is a continuation patent application of U.S. patent application Ser. No. 10/811,132 filed on Mar. 26, 2004 now U.S. Pat. No. 7,195,289, which is incorporated herein by reference.

BACKGROUND

The present invention relates to a system for channeling and distributing fluids which are either gaseous or liquid, under pressure or under vacuum, and it pertains more specifically to a system of elements for a modular connection, in line or at an angle, of pipelines which consist of extruded pipe sections for such units.

The use of extruded hollow bars made of aluminum or the alloys thereof as pipelines in the units for channeling and distributing gaseous or liquid fluids, such as air, gas, oils, water, etc. has already been proposed. These bars have usually at least one longitudinal hole and grooves along the sides of the perimeter defined by longitudinal beads or fins obtained from the extrusion. The bars thus shaped can be connected, in line or at an angle, with other identical hollow bars with the aid of round tubular joints, which are inserted in a fluid-tight manner into the hole of the adjacent bars and with connecting plates which are joined and are locked by means of screws in the outer grooves of the bars to be connected.

However, such a method for constructing pipelines for fluids is complex, labor-intensive, burdensome and not without disadvantages. This method involves the use of extruded hollow bars that have a relatively large and elaborate cross section given the presence of the fins or the faces which must delimit the outer grooves for anchoring the connecting plates. Thus, the bars will be relatively bulky and heavy, and given their profile, are difficult, if not impossible, to bend, where necessary, without modifying the profile of the section in the bent part. In addition, the connecting plates are also complex and require counter-plates for the locking in the outer grooves of the section.

SUMMARY

The present invention provides a fluid distribution system comprising a hollow pipe section having at least one bore extending longitudinally therethrough. A plurality of longitudinal bosses extend along the pipe section and are positioned about the bore. An end fitting comprises a hollow cylindrical body configured to be received in the bore. A shoulder extends radially from the cylindrical body and is configured to abut against an end surface of the pipe section. A plurality of bolt holes extend through the shoulder and are configured to align with the longitudinal bosses. A plurality of fasteners extend through the bolt holes and are secured in the bosses. A secondary component is configured for connection to the end fitting.

The invention further provides an outlet plate fitting configured for attaching a secondary component to a fluid pipe section. The fluid pipe section includes opposed flanges that define a receiving groove having a bottom surface. The outlet plate fitting comprises a main body and an engagement platform connected to and at a distance from the main body. A bore extends through the main body and the engagement platform. A first surface of the engagement platform facing away from the main body is a planar surface with a seal member positioned about the bore and a second surface of the engagement platform facing toward the main body has a ramped surface. Rotation of the engagement platform in a first direction within the receiving groove causes the planar surface and seal member into sealing engagement with the bottom surface of the receiving groove. The outlet plate fitting may further comprise a recess in the main body that defines a stop and a locking plate secured to the main body. The locking plate is moveable between a position wherein the locking plate is clear of the stop and a position wherein the locking plate is aligned with the stop. After the engagement platform is rotated in the first direction, the locking plate is positioned and retained in the second position such that the locking plate prevents rotation of the engagement platform in a second direction opposite to the first direction.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
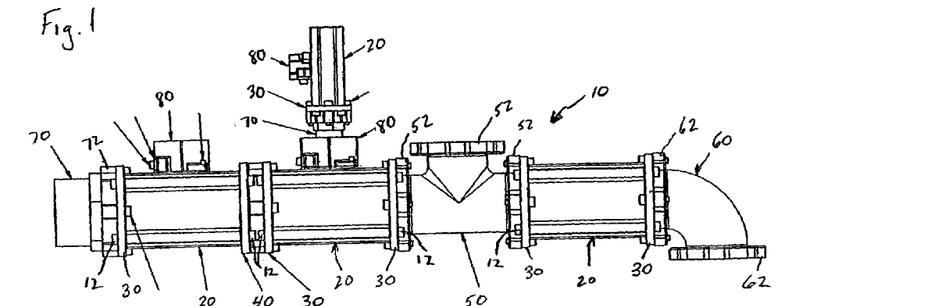
FIG. 1 is a side elevational view of a fluid distribution system that is a first embodiment of the present invention.
Figure 2:
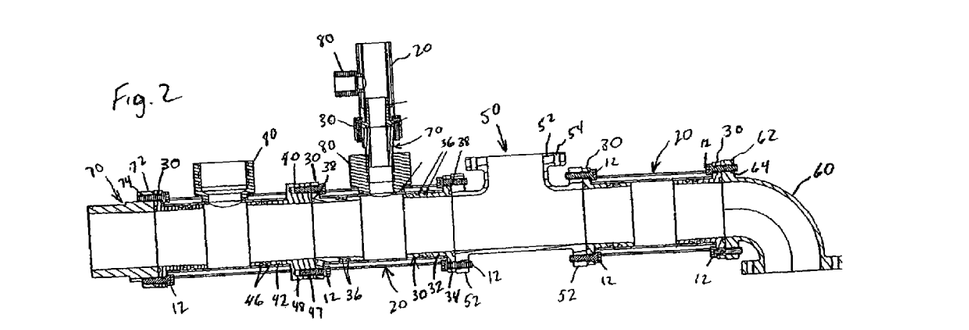
FIG. 2 is a cross sectional view of the fluid distribution system of FIG. 1.

Referring to FIGS. 1 and 2, a fluid distribution system 10 that is a first embodiment of the present invention is shown. The fluid distribution system 10 may include various components including pipe sections 20 and various connectors, for example but not limited to, end fittings 30, 40, tee connectors 50, elbow connectors 60, adapters 70 and outlet plate fittings 80. Additional components not illustrated may also be utilized.

Various embodiments of the pipe section 20, 20', 20" are shown in FIGS. 3-7. Each pipe section 20, 20', 20" includes a longitudinal body 22, 22', 22" with a longitudinal bore 24, 24', 24" extending therethrough. While the pipe sections 20, 20', 20" are shown with a single bore 24, 24', 24", the bodies 22, 22', 22" may be configured to provide more than one bore 24, 24', 24". The pipe sections 20, 20', 20" terminate at each end in a flat face 25, 25', 25" extending substantially perpendicular to the longitudinal axis of the bore 24, 24', 24". The pipe sections 20, 20', 20" are preferably formed by extrusion molding from an aluminum alloy or the like. Other manufacturing processes and materials may also be utilized. The pipe sections 20, 20', 20" can be manufactured to any desired length and cut to a desired length during installation in a fluid distribution system 10.

Each pipe section 20, 20', 20" is provided with a plurality of longitudinal bosses 26, 26', 26" about the perimeter of the bore 24, 24', 24". The bosses 26, 26', 26" are configured to receive fasteners 12, see FIGS. 2 and 8, for connecting end fittings 30, 40, or other components, as will be described hereinafter. The bosses 26, 26', 26" can be tapped to form threads for receiving the threads of the fasteners 12. Alternatively, the fasteners 12 can be self-tapping fasteners that form threads as the fasteners 12 are installed, thereby eliminating the need to tap the bosses 26, 26', 26" prior to assembly. It is preferable that four bosses 26, 26', 26" are provided, as shown, but more or fewer bosses can be provided to achieve a desired level of attachment between the end fitting 30, 40, or other component, and the pipe section 20, 20', 20".

Figure 3:
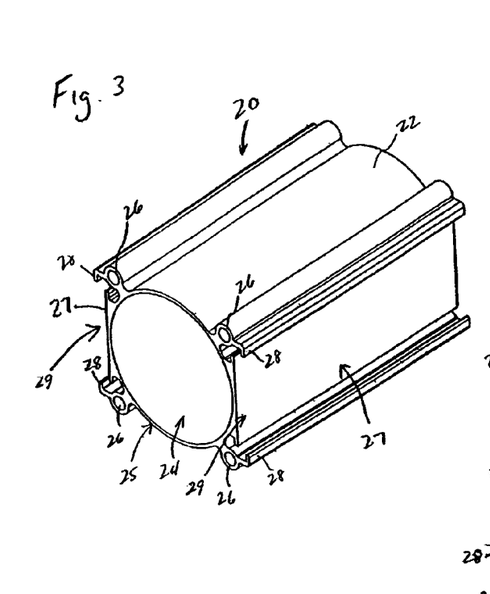
FIG. 3 is an isometric view of a section of pipe utilized in the fluid distribution system of the present invention.
Figure 4:
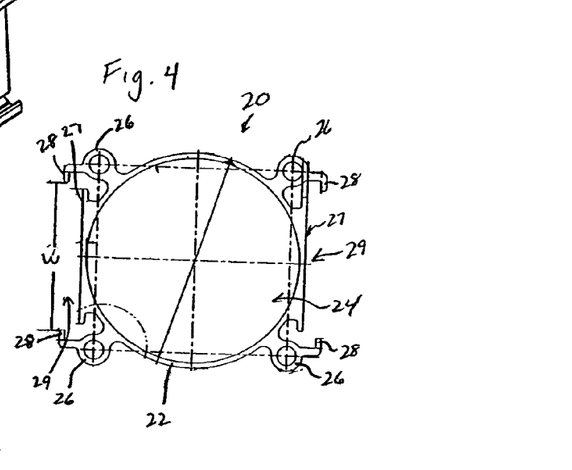
FIG. 4 is an end plan view of the pipe of FIG. 3.

As shown in FIGS. 3 and 4, the bosses 26 of the preferred embodiment are provided in a rectangular configuration about the bore 24. Each boss 26 of pipe section 20 is a cylinder extending the length of the pipe body 22. Flanges 28 extend outward from at least two bosses 26 to define receiving groove 29 therebetween. The receiving groove 29 has an opening thereto with a width W. Flanges 28 are shown extending along the two opposite sides of the pipe section 20, but may be provided along any number of the sides to provide grooves 29 along any of the desired sides of the pipe body 22. The pipe body 22 is preferably manufactured to have a planar surface 27 within each respective groove 29.

Figure 5:
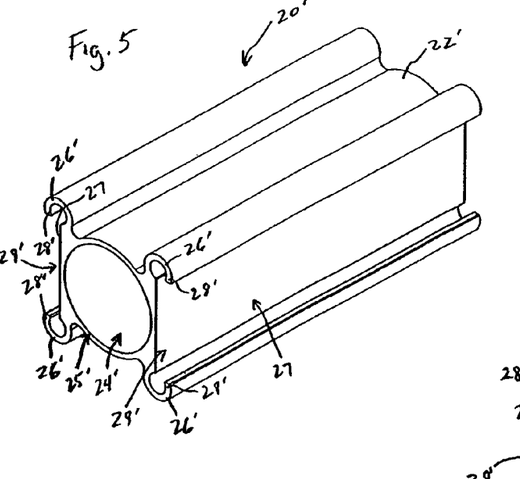
FIG. 5 is an isometric view of a section of an alternate pipe utilized in the fluid distribution system of the present invention.
Figure 6:
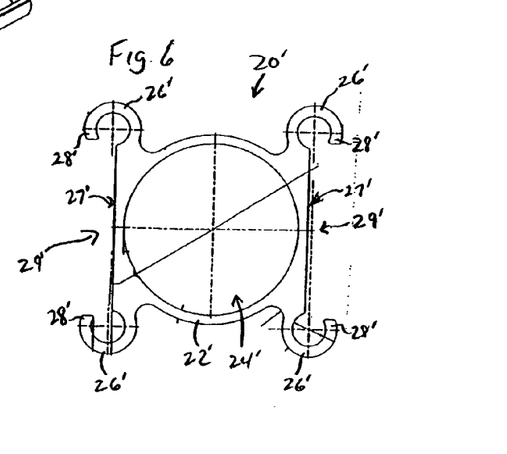
FIG. 6 is an end plan view of the pipe of FIG. 5.

Referring to FIGS. 5 and 6, the bosses 26' of pipe section 20' do not provide a closed circle, but instead extend over an arc of approximately 260° and terminate in flange portions 28'. In this sense, the flanges 28' are provided as part of the bosses 26' with pairs of adjacent flange portions 28' extending toward one another on each side of the pipe section 20' to define a receiving groove 29' on opposite sides of the pipe section 20'. Again, the pipe body 22' is preferably manufactured to have a planar surface 27' within each respective groove 29'. Flanges (not shown) may also be provided on the sides opposite of the flange portions 28' such that grooves are provided on each side of the pipe section 20'. In such case, the pipe body 22' would be provided with planar external surfaces within those grooves as well.

Figure 7:
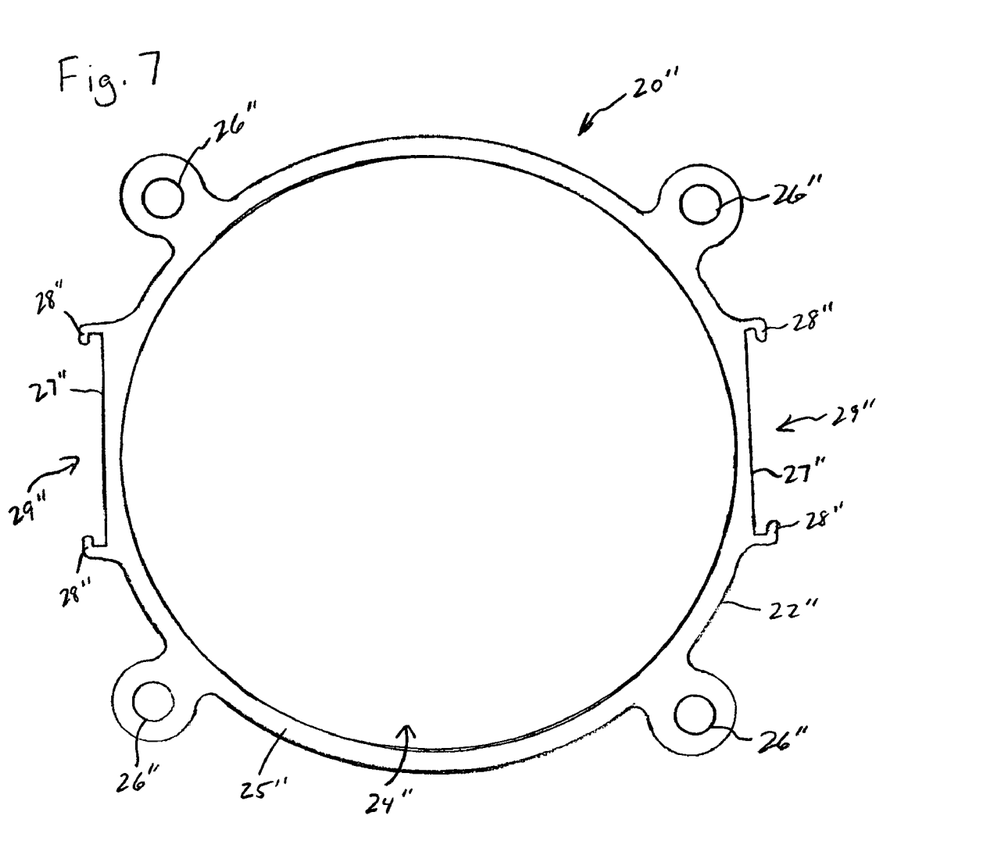
FIG. 7 is an end plan view of an alternate pipe utilized in the fluid distribution system of the present invention.

Referring to FIG. 7, the bosses 26" of pipe section 20" are provided in a rectangular configuration about the bore 24". Each boss 26" of pipe section 20" is a cylinder extending the length of the pipe body 22". Flanges 28" extend outward from opposite sides of the pipe body 22" to define a receiving groove 29" on opposite sides of the pipe section 20". The flanges 28" are spaced from and independent from the bosses 26". The receiving grooves 29" have an opening thereto with a width W, similar to the previous embodiments. As such, one size outlet plate fitting 80 can be utilized with the pipe sections 20, 20', 20" of different sizes and different configurations. The grooves 29" can be formed with a different opening width W if desired to utilize a different size outlet plate fitting 80. Flanges 28" are shown extending along the two opposite sides of the pipe section 20", but may be provided along any number of the sides to provide grooves 29" along any of the desired sides of the pipe body 22". The pipe body 22" is preferably manufactured to have a planar surface 27" within each respective groove 29.

Figures 8, 9:
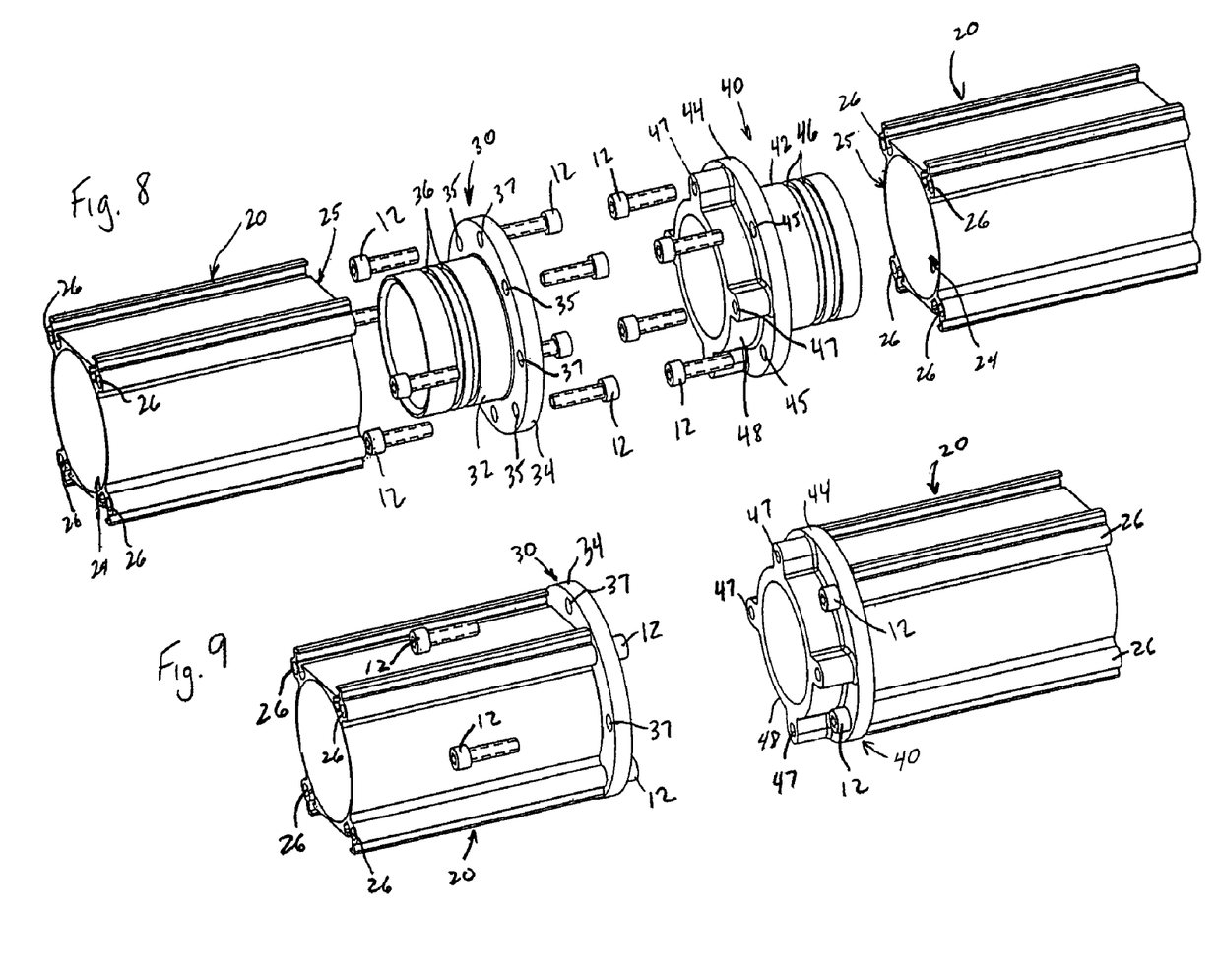
FIG. 8 is an isometric view showing a pair of pipe end fittings positioned relative to a pair of pipe sections.
FIG. 9 is an isometric view similar to FIG. 8 showing each pipe end fitting attached to a respective pipe section.
Figure 10:
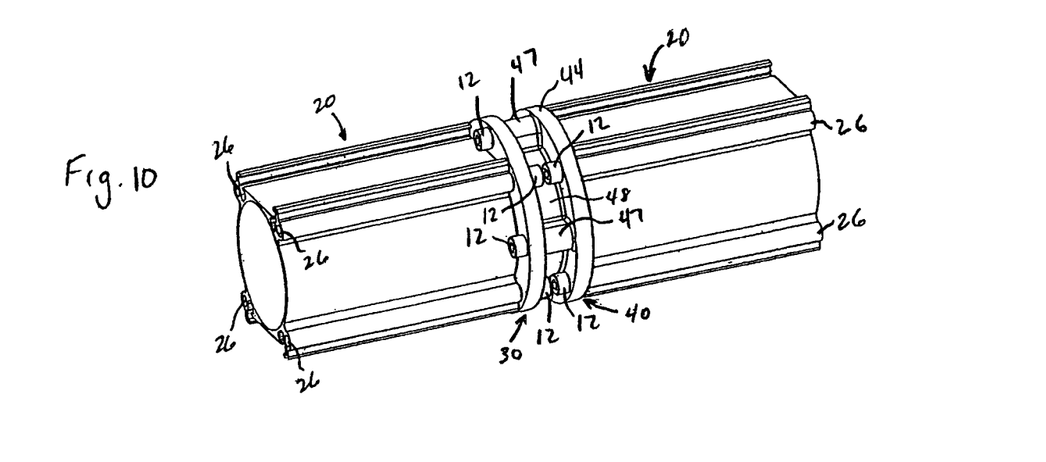
FIG. 10 is an isometric view similar to FIGS. 8 and 9 showing the pair of pipe end fittings interconnected to one another.

Referring to FIGS. 8-10, end fittings 30 and 40 will be described. End fitting 30 is a universal fitting that configures the pipe section 20 for connection to various other components. End fitting 30 includes a hollow cylindrical body 32 having an outer diameter approximately equal to the inside diameter of the pipe section bore 24. The cylindrical body 32 includes one or more circumferential grooves 36 configured to receive o-ring seals (not shown) or the like. The o-ring seals seal between the cylindrical body 32 and the inside of the pipe section bore 24. A radial shoulder 34 extends outward from the cylindrical body 32 at one end thereof. The radial shoulder 34 has an outer diameter greater than the diameter of the pipe section bore 24 such that the radial shoulder 34 abuts against the end face 25 of the pipe section 20. The radial shoulder 34 includes a plurality of spaced bolt holes 35 configured to align with the bosses 26 of the pipe section 20. As shown in FIG. 9, fasteners 12 are passed through the bolt holes 35 and secured in the bosses 26 to secure the end fitting 30 to the pipe section 20. The radial shoulder 34 also includes a plurality of spaced apart bolt holes 37 configured to align with a mating component such that the end fitting 30 may be attached to other components as will be described hereinafter. Additionally, as shown in FIG. 2, the radial shoulder 34 is provided with a circular groove 38 along its face surface configured to receive an o-ring seal (not shown) such that a seal is formed between the end fitting 30 and the other component.

One of the other connecting components is the end fitting 40 shown in FIGS. 8-10. The end fitting 40 is similar to end fitting 30 and includes a hollow cylindrical body 42 having an outer diameter approximately equal to the inside diameter of the pipe section bore 24. The cylindrical body 42 includes one or more circumferential grooves 46 configured to receive o-ring seals (not shown) or the like for sealing between the cylindrical body 42 and the inside of the pipe section bore 24. A radial shoulder 44 extends outward from the cylindrical body 42 at one end thereof and abuts against the end face 25 of the pipe section 20. The radial shoulder 44 includes a plurality of spaced bolt holes 45 configured to align with the bosses 26 of the pipe section 20. As shown in FIG. 9, fasteners 12 are passed through the bolt holes 45 and secured in the bosses 26 to secure the end fitting 40 to the pipe section 20. The end face of the radial shoulder 44 includes a cylindrical stand-off 48. The stand-off is configured to engage and seal against the o-ring seal or the like positioned in the groove 38 of end fitting 30. The stand-off 48 provides a distance sufficient such that the heads of the fasteners 12 securing the two end fittings 30, 40 do not interfere with one another. Bolt receiving bores 47 extend from the stand-off 48 and are configured to align with the bolt holes 37 of the radial shoulder 34. As shown in FIG. 10, fasteners 12 are passed through the bolt holes 37 and received in the bolt receiving bores 47 to secure the end fittings 30 and 40 to one another. Connection of the two end fittings 30 and 40 provides a compact yet secure interconnection between the two pipe sections 20.

Various other connectors can be configured to connect to the end fitting 30, as illustrated in FIGS. 1 and 2. A tee connector 50 is provided with a connecting shoulder 52 at each pipe opening. Each shoulder 52 includes a plurality of bolt receiving bores 54 configured to align with the bolt holes 37 of the radial shoulder 34. As shown in FIG. 2, fasteners 12 are passed through the bolt holes 37 and received in the bolt receiving bores 54 to secure the end fitting 30 to the tee connector 50. The o-ring seal or the like positioned in the end face groove 38 is configured to seal against the shoulder 52.

An elbow 60, with any desired bend, is provided with a connecting shoulder 62 at each end of the pipe. Each shoulder 62 includes a plurality of bolt receiving bores 64 configured to align with the bolt holes 37 of the radial shoulder 34. As shown in FIG. 2, fasteners 12 are passed through the bolt holes 37 and received in the bolt receiving bores 64 to secure the end fitting 30 to the elbow 60. The o-ring seal or the like positioned in the end face groove 38 is configured to seal against the shoulder 62.

A straight adapter 70 is provided with a connecting shoulder 72 at one end thereof. The opposite end of the pipe is provided with a smooth or threaded surface for connection to piping or components of a different type, for example, existing steel piping. The shoulder 72 includes a plurality of bolt receiving bores 74 configured to align with the bolt holes 37 of the radial shoulder 34. As shown in FIG. 2, fasteners 12 are passed through the bolt holes 37 and received in the bolt receiving bores 74 to secure the end fitting 30 to the adapter 70. The o-ring seal or the like positioned in the end face groove 38 is configured to seal against the shoulder 72.

Figure 11:
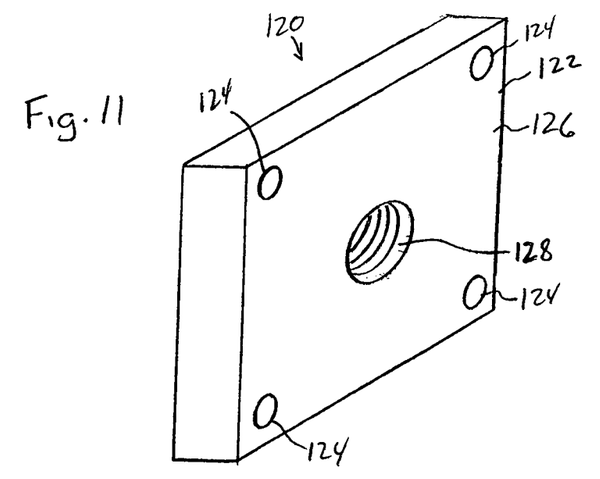
FIG. 11 is an isometric view of an end cap utilized in the fluid distribution system of the present invention.
Figure 12:
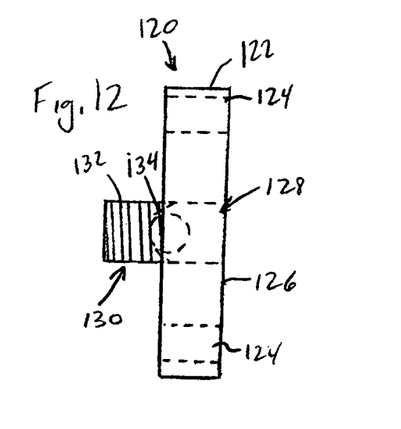
FIG. 12 is a side plan view of the end cap of FIG. 11.

Referring to FIGS. 11 and 12, an end cap 120 connectable with the end fitting 30 is shown. The end cap 120 includes a plate 122 have a series of bolt receiving bores 124 configured to align with the bolt holes 37 of the radial shoulder 34. The plate 122 preferably has a smooth end surface 126 configured to engage and seal against the o-ring seal or the like positioned in the end face groove 38. While the plate 122 is illustrated as a square, it can have a circular or other configuration. The illustrated end cap 120 also includes a connection port 128 configured to receive a connector 130. The illustrated connector 130 is configured to be received in the port 128 with a threaded portion 132 extending from the end cap plate 122. Various components can be attached to the threaded portion 132 of the connector 130, for example, a pressure gauge, a temperature gauge, additional piping and the like. The connector 130 preferably has a valve ball 134 or the like positioned therein. The ball 134 maintains the connector 130 in a sealed state until another component is connected thereto. Other connector and valve configurations can also be utilized. While the end cap 120 is illustrated with one port 128, more or fewer than one port 128 may be provided.

While it is preferred that the various connectors 40, 50, 60, 70 be provided with bolt receiving bores and that the end fitting shoulder 34 be provided with bolt holes 37, other connection means may also be utilized. For example, the end fitting shoulder 34 may have bolt receiving bores that receive fasteners extended through the various connectors. Alternatively, the end fitting shoulder 34 may not have any additional holes or bores, but instead, self taping fasteners are utilized to secure the various connectors to the planar surface of the end fitting shoulder 34. Alternatively, the end fitting shoulder 34 may be manufactured with integral fasteners, for example threaded bolts, snap clips or the like, that are received in holes in the various connectors 40, 50, 60, 70. Other means of connecting the end fitting 30 to the various connectors 40, 50, 60, 70 are within the scope of this invention.

The pipe sections 20 fitted with the end fittings 30, 40 and the various connectors, including the illustrated tee connectors 50, elbow connectors 60, adapters 70, and additional components not illustrated, allow a fluid distribution system 10 having any desired configuration. The ability to cut the pipe sections 20 to any desired length and to easily interconnect the pipe sections 20 to numerous connectors provides great flexibility in the system 10.

At times it may also be desirable to interconnect additional components or piping to an intermediate portion of a pipe section 20. For example, it may be desirable to add an additional component along a pipe section 20 in an existing system 10. Rather than stop the fluid flow through the system 10 to splice in to the pipe section 20, the system 10 includes outlet plate fittings 80 that tap in to the pipe section 20 without requiring the flow through the pipe section 20 to be stopped.

An outlet plate fitting 80 that is a preferred embodiment of the present invention will be described with reference to FIGS. 13-18. The outlet plate fitting 80 includes a main body 82 with a bore 86 therethrough. The body 82 preferably has a plurality of flat sides 84, for example six as shown, to facilitate rotation of the outlet plate fitting 80 as will be described hereinafter. A pair of securing blocks 100 and 110 extend from the main body 82. The first securing block 100 has a set screw receiving bore 102 extending generally parallel to the axis of the bore 86. The second securing block 110 has a locking plate screw receiving bore 114 extending in to an end surface 112 of the block, generally perpendicular to the axis of the bore 86. The end surface 112 is recessed a distance R from the main body wall 84 such that the main body wall 84 defines a stop surface 88 for the locking plate 116 as will be described hereinafter.

Figure 15:
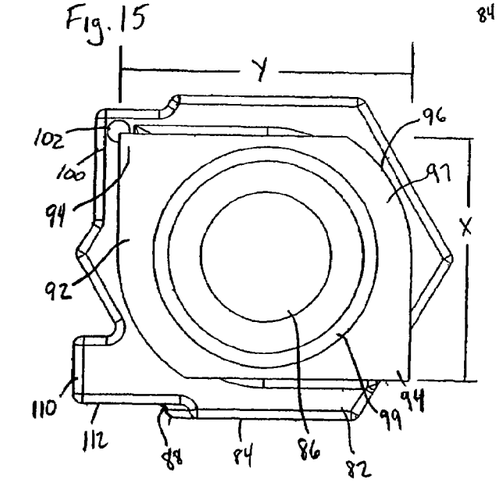
FIG. 15 is a bottom plan view of the outlet plate fitting body of FIG. 13.

An engagement portion 90 extends below the main body 82, with the bore 86 extending through the engagement portion 90. The engagement portion 90 includes an engagement platform 92 spaced from the underside 85 of the main body 82 by a neck portion 91. As shown in FIG. 15, the engagement platform 92 has a generally rectangular configuration with two opposed corners 94 having a squared configuration and the other two corners 96 having a rounded configuration. The platform 92 has a width X along one edge that is less than the length Y along the other edge. The width X is approximately the same size or smaller than the width W of the opening in to the pipe receiving groove 29 while the length Y is greater than such width W.

Figure 13:
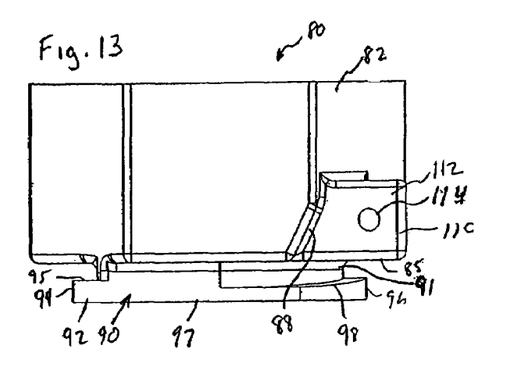
FIG. 13 is a side elevational view of an outlet plate fitting body utilized in the fluid distribution system of the present invention.

The engagement platform 92 has a substantially planar contact surface 97 with a circumferential groove 99 extending about the bore 86. The groove 99 is configured to receive an o-ring seal (not shown) or the like to seal against the planar surface 27 within the pipe section receiving groove 29. As seen in FIG. 13, the squared corners 94 of the platform 92 have flat engagement surfaces 95 while the rounded corners 96 have ramped surfaces 98.

Figure 16:
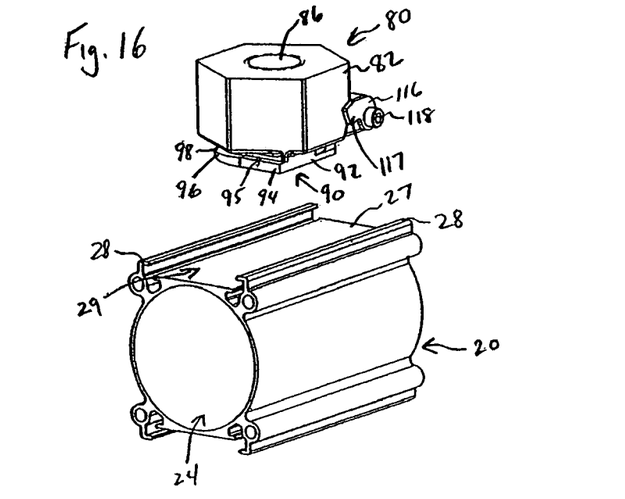
FIG. 16 illustrates an outlet plate fitting positioned for attachment to a respective pipe section.
Figure 17:
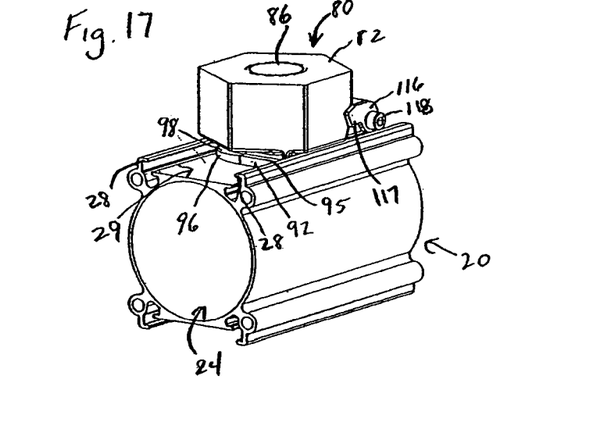
FIG. 17 illustrates the outlet plate fitting positioned within the pipe groove prior to rotation thereof.
Figure 18:
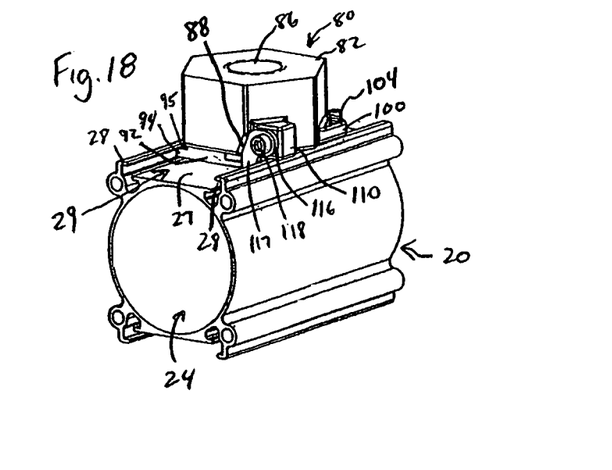
FIG. 18 illustrates the outlet plate fitting rotated and locked relative to the pipe section.

Referring to FIGS. 16 and 17, the outlet plate fitting 80 is positioned in the pipe section receiving groove 29 in a first orientation wherein the platform 92 edges having a length Y extend parallel to the longitudinal axis of the pipe section 20. As such, the width X of the platform 92 is able to fit within the width W of the pipe receiving groove 29 opening. Once the platform 92 is positioned within the pipe receiving groove 29, the outlet plate fitting 80 is rotated via the main body 82 such that the pipe section flanges 28 ride up the ramps 98 of the engagement platform 92 until the flanges 28 engage the flat engagement surfaces 95 as seen in FIG. 18. The squared corners 94 of the engagement platform 92 prevent the outlet plate fitting 80 from being rotated beyond 90 degrees. As the rotating engagement along the ramps 98 occurs, the contact surface 97 is pressed toward the pipe planar surface 27, thereby compressing the o-ring seal or the like and forming a seal between the contact surface 97 and the pipe planar surface 27.

Figure 14:
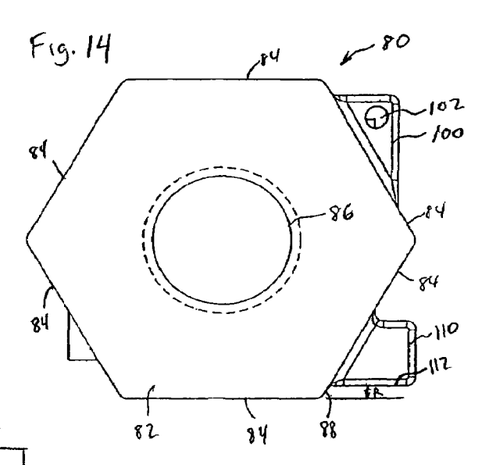
FIG. 14 is a top plan view of the outlet plate fitting body of FIG. 13.

Referring to FIGS. 13-15, locking plate 116 is secured to the second securing block 110 via a screw 118 or the like. The locking plate 116 has a projecting portion 117 or the like at its opposite end configured to engage between the stop 88 and the pipe section flange 28, as will be described hereinafter. The screw 118 is of a length such that the locking plate 116 may be moved away from the recessed wall 112 sufficiently to rotate clear of the stop 88, as seen in FIGS. 13-14. After the outlet plate fitting 80 has been positioned and rotated in the pipe receiving groove 29, the locking plate 116 is rotated about the screw 118 until the projecting portion 117 is positioned between the stop 88 and the flange 28. Once the bolt 118 is fastened, the projecting portion 117 is locked between the stop 88 and the flange 28, thereby preventing the outlet plate fitting 80 from rotating in a disengaging direction, as illustrated, in a counterclockwise direction. As such, once secured, the squared corners 94 of the engagement platform 92 and the locking plate 116 prevent rotation of the outlet plate fitting 80, thereby preventing inadvertent disengagement of the outlet plate fitting 80.

While the sealing force between the engagement platform 92 and the pipe planar surface 27 is fairly strong, there will generally be some play between the components such that the outlet plate fitting 80 may be moved axially within the pipe receiving groove 29. This axial movement allows the outlet plate fitting 80 to be precisely positioned. Once positioned, the set screw 104, see FIG. 18, is tightened against the flange 28, thereby locking the axial position of the outlet plate fitting 80.

The outlet plate fitting 80 is positional relative to the pipe section 20 without having to disrupt the flow through the pipe section 20. Only after the outlet plate fitting 80 is positioned as desired, the pipe section 20 is tapped. It is preferable that the pipe section 20 be tapped using a device capable of tapping a pressurized pipe as described in U.S. Pat. No. 6,491,057 which is incorporated herein by reference. The bore 86 may be provided with any configuration, for example, threaded or smooth, to facilitate connection of the taping device and associated components, directly to the outlet plate fitting 80.

Figure 19:
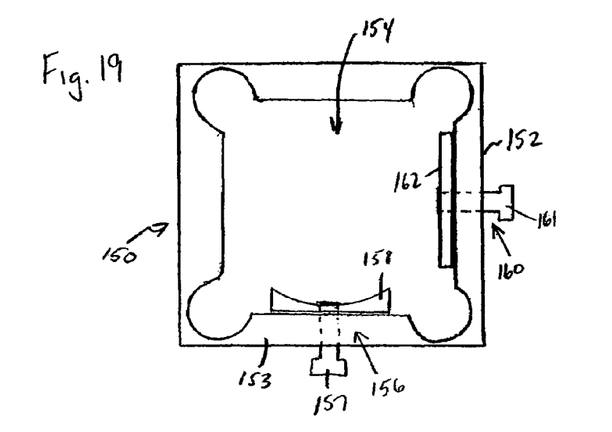
FIG. 19 is an end plan view of a cutting guide for use with the pipe of the present invention.
Figure 20:
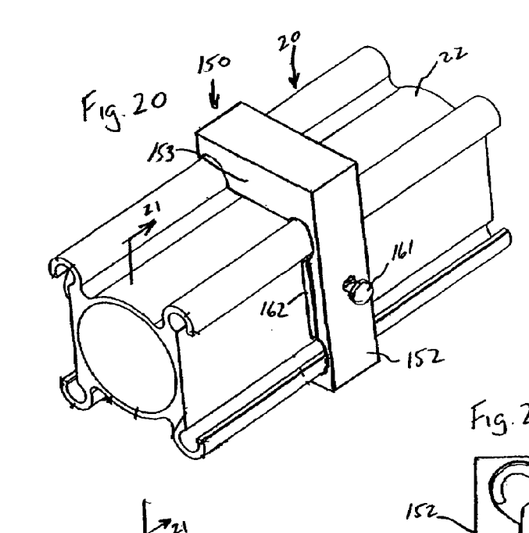
FIG. 20 is an isometric view of a pipe section with the cutting guide positioned thereabout.
Figure 21:
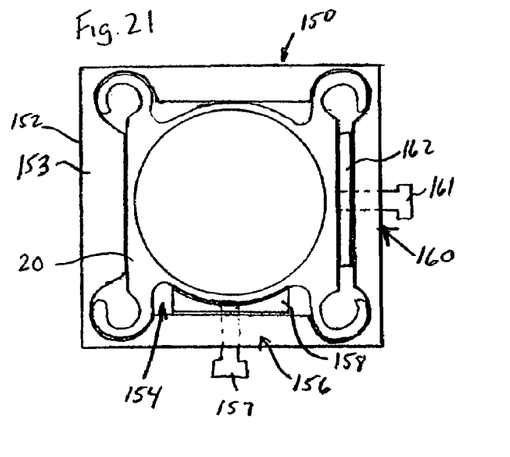
FIG. 21 is an end plan view along the line 21-21 of FIG. 20.

During installation of the fluid distribution system 10, pipe sections 20 may require cutting to a desired length. The extruded pipe body 22 is generally easily cut utilizing a chop saw or the like. However, for larger diameter pipe or in instances when a chop saw is not available, a cutting guide 150 as shown in FIGS. 19-21 may be utilized. The cutting guide 150 has a rectangular body 152 with an opening 154 therethrough. A planar guide surface 153 extends about the opening 154. The opening 154 is configured to complement the configuration of the pipe section 20 being cut. In the illustrated embodiment, the opening 154 is configured to fit about a section of pipe 20'. To ensure that the cutting guide 150 is secured to the pipe section 20 perpendicular to the axis of the pipe section 20, the cutting guide 150 includes a pair of securing guides 156, 160. Each securing guide 156, 160 has an adjustable fastener 157, 161 engaging a securing plate 158, 162. Once the cutting guide 150 is positioned about the pipe section 20 as illustrated in FIG. 20, the fasteners 157, 161 are tightened, thereby confining the pipe section 20 within the cutting guide opening 154. The securing plates 158, 162 may be provided with small projections or the like (not shown) that bite in to the pipe body 22 upon tightening to further reduce the likelihood of axial movement of the cutting guide 150. With the cutting guide 150 secured in position, a handheld saw, for example a circular saw or a reciprocating saw, can be used to cut the pipe section 20. In the case of a circular saw, the saw guide plate travels against the planar surface 153 to ensure a straight cut. The pipe section 20 may need to be rotated and cut along multiple sides to complete the cut. With the reciprocating saw, the saw blade travels along the planar surface 153 as the pipe section 20 is cut.

What is claimed is:

1. An outlet plate fitting configured for attaching a secondary component to a fluid pipe section, the fluid pipe section including opposed flanges that define a receiving groove having a bottom surface, the outlet plate fitting comprising:

a main body;

an engagement platform connected to and at a distance from the main body, the engagement platform including a rounded corner; and a bore extending through the main body and the engagement platform;

wherein a first surface of the engagement platform facing away from the main body is a planar surface with a seal member positioned about the bore and a second surface adjacent the rounded corner of the engagement platform facing toward the main body has a ramped surface, such that rotation of the engagement platform in a first direction within the receiving groove causes the planar surface and seal member into sealing engagement with the bottom surface of the receiving groove.

2. An outlet plate fitting configured for attaching a secondary component to a fluid pipe section, the fluid pipe section including opposed flanges that define a receiving groove having a bottom surface, the outlet plate fitting comprising:

a main body;

an engagement platform connected to and at a distance from the main body;

a bore extending through the main body and the engagement platform;

wherein a first surface of the engagement platform facing away from the main body is a planar surface with a seal member positioned about the bore and a second surface of the engagement platform facing toward the main body has a ramped surface, such that rotation of the engagement platform in a first direction within the receiving groove causes the planar surface and seal member into sealing engagement with the bottom surface of the receiving groove;

a recess in the main body that defines a stop; and a locking plate secured to the main body such that it is moveable between a position wherein the locking plate is clear of the stop and a position wherein the locking plate is aligned with the stop and wherein after the engagement platform is rotated in the first direction, the locking plate is retained in the second position such that the locking plate is secured between the stop and one of the flanges and thereby prevents rotation of the engagement platform in a second direction opposite to the first direction.

3. The outlet plate fitting of claim 2 wherein the engagement platform has at least one square corner that abuts at least one of the flanges when the engagement platform is rotated in the first direction such that the engagement platform is prevented from rotating in the first direction beyond 90 degrees.

4. An outlet plate fitting configured for attaching a secondary component to a fluid pipe section, the fluid pipe section including opposed flanges that define a receiving groove having a bottom surface, the outlet plate fitting comprising:

a main body;

an engagement platform connected to and at a distance from the main body;

a bore extending through the main body and the engagement platform;

wherein a first surface of the engagement platform facing away from the main body is a planar surface with a seal member positioned about the bore and a second surface of the engagement platform facing toward the main body has a ramped surface, such that rotation of the engagement platform in a first direction within the receiving groove causes the planar surface and seal member into sealing engagement with the bottom surface of the receiving groove; and a set screw associated with the main body and positioned such that after the engagement platform is rotated in the first direction, the set screw is aligned with one of the flanges and wherein the set screw is advanced in to contact with the flange to prevent longitudinal movement of the outlet plate fitting.

* * * * *